(12) United States Patent
Hirata et al.

(10) Patent No.: US 10,168,591 B2
(45) Date of Patent: Jan. 1, 2019

(54) LIQUID CRYSTAL DISPLAY DEVICE

(71) Applicant: Mitsubishi Electric Corporation, Tokyo (JP)

(72) Inventors: Naoya Hirata, Tokyo (JP); Takahiro Ueno, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 11 days.

(21) Appl. No.: 15/296,675

(22) Filed: Oct. 18, 2016

(65) Prior Publication Data

US 2017/0212395 A1    Jul. 27, 2017

(30) Foreign Application Priority Data

Aug. 26, 2015 (JP) ................... 2015-166307

(51) Int. Cl.

| | |
|---|---|
| *G02F 1/1368* | (2006.01) |
| *G02F 1/1362* | (2006.01) |
| *G02F 1/1333* | (2006.01) |
| *G02F 1/1335* | (2006.01) |
| *G02F 1/1339* | (2006.01) |
| G02F 1/1343 | (2006.01) |

(52) U.S. Cl.
CPC ...... *G02F 1/136204* (2013.01); *G02F 1/1339* (2013.01); *G02F 1/1368* (2013.01); *G02F 1/133345* (2013.01); *G02F 1/133514* (2013.01); *G02F 1/134363* (2013.01); *G02F 1/134336* (2013.01); *G02F 1/136286* (2013.01); *G02F 2001/134372* (2013.01)

(58) Field of Classification Search
CPC .................................................. G02F 1/136204
See application file for complete search history.

(56) References Cited

U.S. PATENT DOCUMENTS

| | | | |
|---|---|---|---|
| 9,354,457 B2 | 5/2016 | Nishino et al. | |
| 2011/0304564 A1* | 12/2011 | Kim ....................... | G06F 3/044 345/173 |
| 2013/0050626 A1* | 2/2013 | Miyanaga ............. | G02F 1/1345 349/139 |

(Continued)

FOREIGN PATENT DOCUMENTS

| | | | | |
|---|---|---|---|---|
| JP | 2007-140353 | * | 6/2007 | .......... G02F 1/1345 |
| JP | 2008-145462 A | | 6/2008 | |

(Continued)

*Primary Examiner* — Sang V Nguyen

(74) *Attorney, Agent, or Firm* — Studebaker & Brackett PC (57) ABSTRACT

A liquid crystal display device includes a TFT substrate, a color filter substrate, liquid crystals, a transparent conductive film, a panel identification pad, and conductive paste. The color filter substrate is opposed to the TFT substrate and has a color filter. The liquid crystals are sealed between the TFT substrate and the color filter substrate. The transparent conductive film is located on a front surface side of the color filter substrate including a periphery of the color filter substrate. The panel identification pad is located on a terminal area that is a portion of the TFT substrate extending beyond the color filter substrate. The panel identification panel is conductive and connected to a ground potential. The conductive paste electrically connects the panel identification pad with the transparent conductive film located on the periphery of the color filter substrate.

6 Claims, 5 Drawing Sheets

(56) References Cited

U.S. PATENT DOCUMENTS

| | | | | |
|---|---|---|---|---|
| 2013/0088672 | A1* | 4/2013 | Shin | G02F 1/133512 |
| | | | | 349/110 |
| 2014/0027771 | A1* | 1/2014 | Satoh | H01L 23/544 |
| | | | | 257/48 |
| 2014/0111724 | A1* | 4/2014 | Nishino | G02F 1/1309 |
| | | | | 349/43 |
| 2014/0132859 | A1* | 5/2014 | Yanase | G06F 3/0412 |
| | | | | 349/12 |
| 2016/0291429 | A1* | 10/2016 | Peng | G02F 1/136204 |
| 2016/0370683 | A1* | 12/2016 | Yang | G02F 1/1343 |

FOREIGN PATENT DOCUMENTS

| | | |
|---|---|---|
| JP | 2008-145686 A | 6/2008 |
| JP | 2011-123231 A | 6/2011 |
| JP | 2014-085424 A | 5/2014 |

\* cited by examiner

LIQUID CRYSTAL DISPLAY DEVICE

BACKGROUND OF THE INVENTION

Field of the Invention

The present invention relates to liquid crystal display devices.

Description of the Background Art

Electro-optical display devices, or, liquid crystal display devices that employ the in-plane switching (IPS) or the fringe field switching (FFS) in particular need to dissipate electric charge on a display surface of a display panel in order to avoid degradation of display quality. For example, as described in Japanese Patent Application Laid-Open No. 2008-145462, such a device typically includes a conductive tape or conductive paste to electrically connect an electrode located on a TFT substrate with the display surface of the display panel.

The device described in Japanese Patent Application Laid-Open No. 2008-145462 includes, in a terminal area, not only a grounding electrode but also components such as an ID pad, a discrimination mark, a driver IC, and a flexible printed circuit (FPC). Many recent thin-frame display devices have failed to leave sufficient space for a pattern of the grounding electrode, which is to be formed separately from patterns of the above-mentioned components and is to be designed specifically for an electrical connection with a transparent conductive film located on the upper surface of a color filter substrate.

Unlike the conductive paste, the conductive tape for use in establishing an electrical connection between such an electrode and the display surface of the display panel needs to cover a wide area so as to ensure its adherence and allow necessary workspace for its affixation. This structure fails to provide greater flexibility in designing micro-display panels and thin-frame display panels.

To overcome the above-mentioned problem associated with the design requirements, the conductive paste is used to electrically connect such an electrode with the display surface of the display panel, thereby offering a space-saving design. An example of this technique is disclosed in Japanese Patent Application Laid-Open No. 2008-145686.

However, recent liquid crystal display devices have stringent design requirements due to the trend toward thin-frame display devices, and thus, the above technique disclosed in Japanese Patent Application Laid-Open No. 2008-145686 may not meet the requirements.

To overcome the problem associated with the design requirements, another technique has been developed to provide a thin-frame display device in which an inspection pad doubles as the grounding electrode to dissipate electric charge. An example of this technique is disclosed in Japanese Patent Application Laid-Open No. 2014-085424.

Although the display device according to the technique described in Japanese Patent Application Laid-Open No. 2014-085424 includes a switching element located between the inspection pad and a panel display unit (display area), the inspection pad which doubles as the grounding electrode is electrically connected to the panel display unit. In the event of the entry of electric charge associated with static electricity into, for example, the color filter, the conductive paste, or the conductive tape, the electric charge can probably enter the display area through signal lines and accordingly break signal lines and TFT elements located in display pixels.

SUMMARY OF THE INVENTION

The present invention has objects to minimize a weakening of resistance of a liquid crystal display device to static electricity and to reduce a frame width of the liquid crystal display device.

A liquid crystal display device according to the present invention includes a TFT substrate, a color filter substrate, liquid crystals, a transparent electrode, at least one identification mark, and at least one conductive member. The color filter substrate is opposed to the TFT substrate and has a color filter. The liquid crystals are sealed between the TFT substrate and the color filter substrate. The transparent electrode is located on a front surface side of the color filter substrate including a periphery of the color filter substrate. The at least one identification mark is located on a terminal area that is a portion of the TFT substrate extending beyond the color filter substrate. The at least one identification mark is conductive and connected to a ground potential. The at least one conductive member electrically connects the at least one identification mark with the transparent electrode located on the periphery of the color filter substrate.

The liquid crystal display device includes the transparent electrode, the at least one identification mark, and the at least one conductive member. The transparent electrode is located on the front surface side of the color filter substrate including the periphery of the color filter substrate. The at least one identification mark is located on the terminal area that is a portion of the TFT substrate extending beyond the color filter substrate. The at least one identification mark is conductive and connected to the ground potential. The at least one conductive member electrically connects the at least one identification mark with the transparent electrode located on the periphery of the color filter substrate.

The identification mark, which is no longer used after the shipment of the display device, doubles as the grounding electrode and accordingly eliminates the need for another grounding electrode on the terminal area of the TFT substrate. Using this structure one can obtain a thin-frame liquid crystal display device.

If electric charge associated with static electricity enters the conductive member or the surface of the color filter, the electric charge would be inhibited from entering the display area and would be discharged through the identification mark that is located on the terminal area of the TFT substrate and is not electrically connected with the display area. This can minimize a weakening of resistance of the liquid crystal display device to static electricity.

These and other objects, features, aspects and advantages of the present invention will become more apparent from the following detailed description of the present invention when taken in conjunction with the accompanying drawings.

DESCRIPTION OF THE PREFERRED EMBODIMENT

Preferred Embodiment

Figure 1:
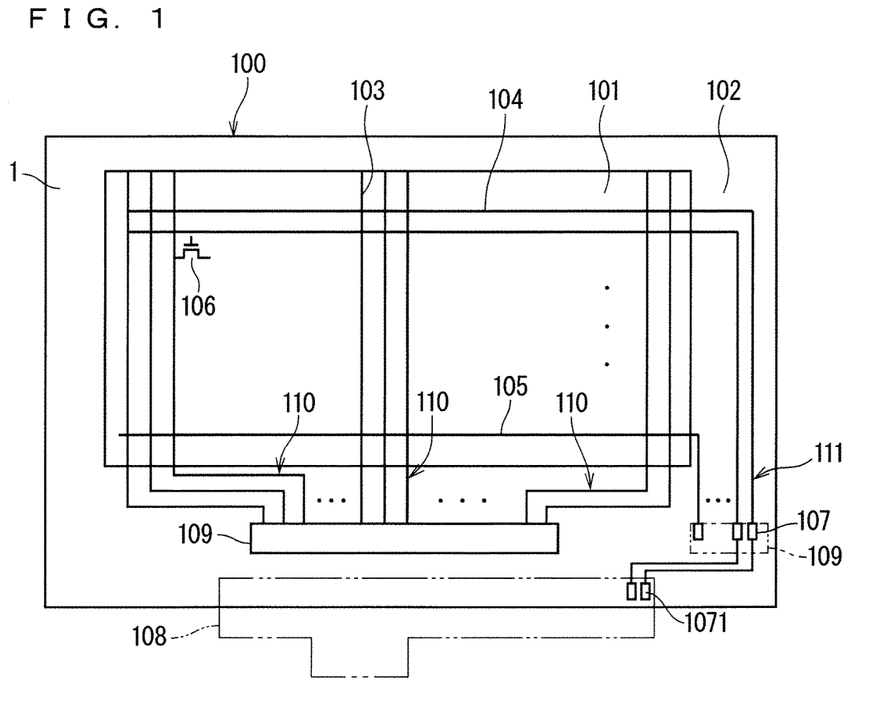
FIG. 1 is a plan view of a wiring structure of a liquid crystal display device according to a preferred embodiment.

The following will describe a preferred embodiment of the present invention with reference to the drawings. FIG. 1 is a plan view of a wiring structure of a liquid crystal display device according to the preferred embodiment. All of the accompanying drawings are merely schematic illustrations and do not necessarily reflect, for example, the exact size of each constituent component. For easy understanding, each drawing eliminates or simplifies part of the configuration except for the main constituent components of the present invention.

The wiring structure of the liquid crystal display device will now be described. As illustrated in FIG. 1, the wiring structure of the liquid crystal display device is included in a liquid crystal display panel 100, which is a main constituent component of the liquid crystal display device. FIG. 1 eliminates a color filter substrate 2 (see FIG. 2), which will be described below, to make the wiring structure visible. The liquid crystal display panel 100 includes a display area 101 on which an image is displayed and a frame area 102 surrounding the display area 101.

The display area 101 will be firstly described. In the display area 101, a plurality of signal lines 103 and a plurality of scanning lines 104 cross each other. The point at which each signal line 103 and each scanning line 104 cross each other is referred to as an "intersection". The scanning lines 104 are in parallel with a plurality of common wires 105. The common wires 105 are connected with common electrodes (not shown), each of which is located in the corresponding one of pixel portions, so as to supply a common potential.

Each pixel portion is defined by two adjacent signal lines 103 and two adjacent scanning lines 104. That is to say, a plurality of pixel portions are arranged in matrix in the display area 101. Each pixel portion includes at least one pixel electrode (not shown).

Each pixel portion includes the corresponding one of thin-film transistors 106, which are located in the intersections of the signal lines 103 and the scanning lines 104. The thin-film transistors 106 are connected with the corresponding pixel electrodes (not shown).

The frame area 102 will now be described. Provided in the frame area 102 are a plurality of mounting terminals 107 and a plurality of external connection terminals 1071. Each mounting terminal 107 is connected with one of lead-out wires 110 that extend from the signal lines 103 running across the display area 101, or is connected with one of lead-out wires 111 that extend from scanning lines 104 running across the display area 101. The external connection terminals 1071 are connected with the corresponding mounting terminals 107.

The mounting terminals 107 are connected with an integrated circuit (IC) chip 109 for controlling signals. The external connection terminals 1071 are connected with a wiring board 108 including a flexible printed circuit (FPC).

Figure 2:
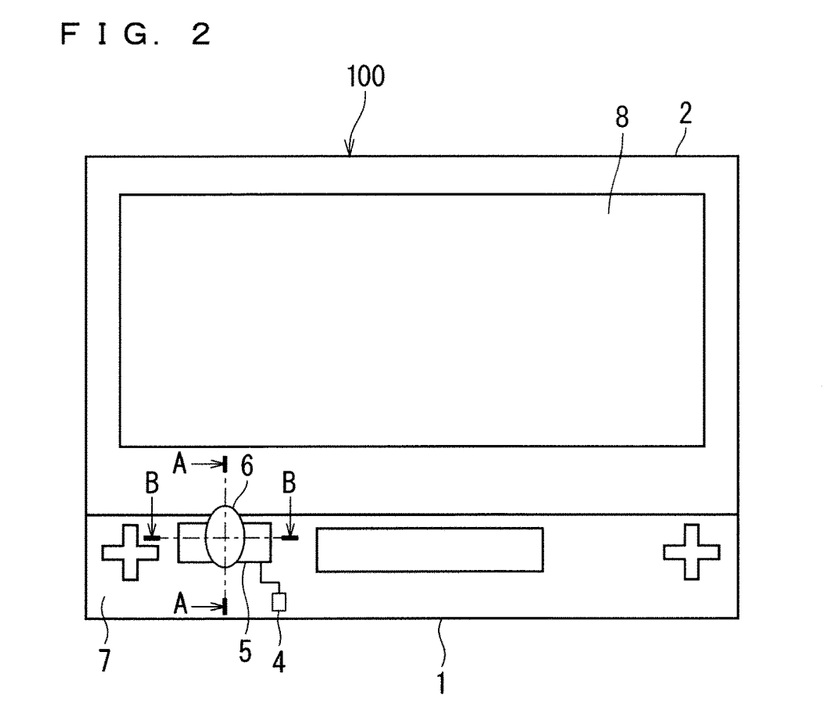
FIG. 2 is a plan view of the liquid crystal display device.
Figure 3:
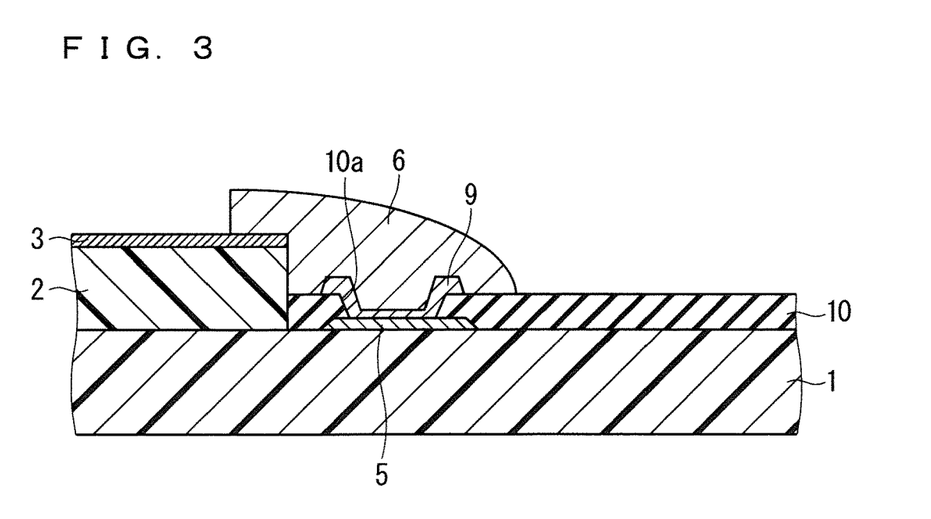
FIG. 3 is a cross-sectional view of the liquid crystal display device taken along the line A-A of FIG. 2.
Figure 4:
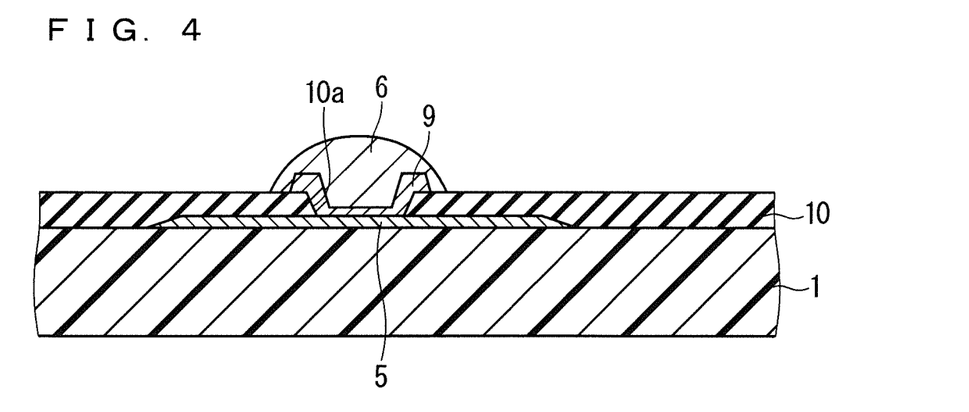
FIG. 4 is a cross-sectional view of the liquid crystal display device taken along the line B-B of FIG. 2.

The structure of the liquid crystal display device will now be described. FIG. 2 is a plan view of a liquid crystal display device. FIG. 3 is a cross-sectional view of the liquid crystal display device taken along the line A-A of FIG. 2. FIG. 4 is a cross-sectional view of the liquid crystal display device taken along the line B-B of FIG. 2.

As illustrated in FIGS. 2 and 3, the liquid crystal display device includes a TFT substrate 1, the color filter (CF) substrate 2, liquid crystals (not shown), a transparent conductive film 3 (a transparent electrode), a panel identification pad 5 (an identification mark), conductive paste 6 (a conductive member), an insulating layer 10, and a conductive film 9.

The CF substrate 2 has a color filter and is opposed to the TFT substrate 1. The TFT substrate 1 and the CF substrate 2 are bonded to each other with the liquid crystals sealed therebetween to constitute the liquid crystal display device. The liquid crystal display device includes a display area 8 for use in performing display and a terminal area 7. The terminal area 7 extends outward from an edge of the display area 8. Specifically, the TFT substrate 1 is larger than the CF substrate 2 in a plan view, and the terminal area 7 is a portion of the TFT substrate 1 that extends beyond the CF substrate 2.

As described above, the signal lines 103, the scanning lines 104, the common wires 105, the thin-film transistors 106, the pixel electrodes, and the common electrodes are located on the TFT substrate 1. The pixel electrodes and the common electrodes sandwich an electric field that extends mainly in parallel with the surface of the base material of the TFT substrate 1 and is applied onto a liquid crystal layer. That is to say, the liquid crystal display device according to this preferred embodiment is a transverse electric-filed liquid crystal display device that employs a known technique such as the in-plane switching (IPS) or the fringe field switching (FFS).

The TFT substrate 1 and the CF substrate 2 are mainly made of an insulating material such as glass, plastic, or a resin film. Provided on the surface of the TFT substrate 1 mainly made of such an insulating material are an FPC connection electrode 4 and the panel identification pad 5 that are made of conductive materials such as metal. Provided on the surface of the CF substrate 2 mainly made of such an insulating material is the transparent conductive film 3 made of, for example, indium tin oxide (ITO).

Figure 8:
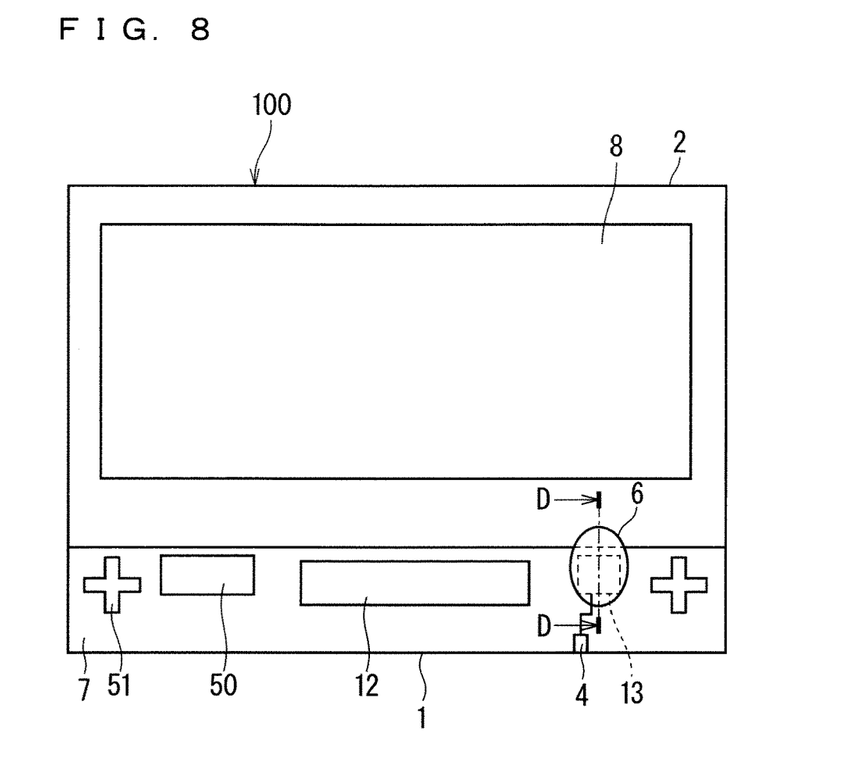
FIG. 8 is a plan view of a liquid crystal display device according to an underlying technique.
Figure 9:
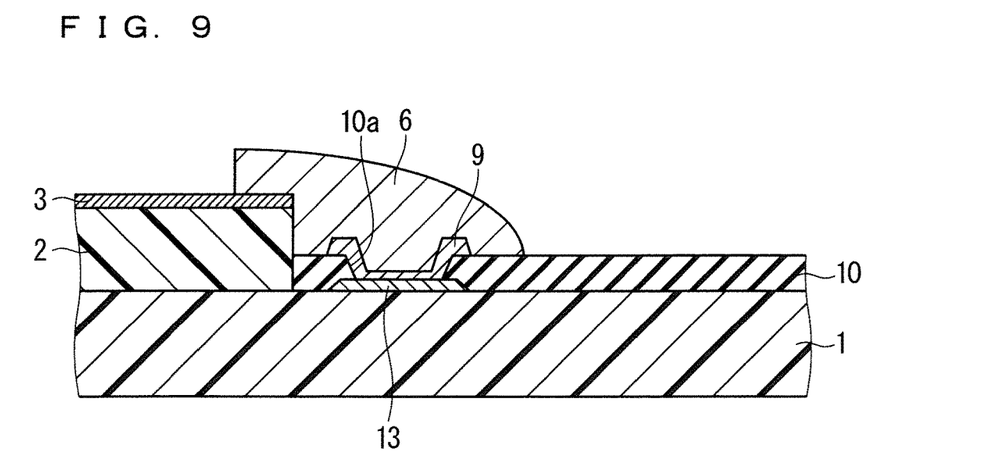
FIG. 9 is a cross-sectional view of the liquid crystal display device taken along the line D-D of FIG. 8.

The following will briefly describe a liquid crystal display device according to an underlying technique. FIG. 8 is a plan view of the liquid crystal display device according to the underlying technique. FIG. 9 is a cross-sectional view of the liquid crystal display device taken along the line D-D of FIG. 8. As illustrated in FIGS. 8 and 9, the liquid crystal display device according to the underlying technique includes the FPC connection electrode 4 and a grounding electrode 13 connected with the FPC connection electrode 4 that are located on the terminal area 7 of the TFT substrate 1. The grounding electrode 13 is electrically connected with the transparent conductive film 3 through the conductive paste 6 and the conductive film 9 that covers an opening 10a in the insulating layer 10. Supplying a ground (GND) potential from the FPC connected with the FPC connection electrode 4 establishes a ground for the grounding electrode 13. This structure enables electric charge on the display surface of the liquid crystal display device to be discharged through the transparent conductive film 3, the conductive paste 6, the conductive film 9, the grounding electrode 13, the FPC connection electrode 4, and the FPC.

As illustrated in FIG. 8, the liquid crystal display device includes, in the terminal area 7, not only the grounding electrode 13 but also components such as an ID pad 50, a discrimination mark 51, a driver IC12, and the FPC. Many recent thin-frame display devices have failed to leave sufficient space for a pattern of the grounding electrode (e.g., the grounding electrode 13 in FIG. 8), which is to be formed separately from patterns of the above-mentioned components and is to be designed specifically for an electrical connection with the transparent conductive film 3.

To overcome this problem, the panel identification pad 5, which is no longer used after the shipment of the display device, doubles as the grounding electrode in this preferred embodiment. According to the underlying technique, meanwhile, the ID pad 50 is covered with the insulating layer 10, and thus, is not electrically connected with the transparent conductive film 3.

In this preferred embodiment, the panel identification pad 5 is covered with the insulating layer 10, with a part of the panel identification pad 5 being exposed from the insulating layer 10. The conductive film 9 is located between the conductive paste 6 and the part of the panel identification pad 5 exposed from the insulating layer 10 so as to establish an electrical connection therebetween. Specifically, the surface of the panel identification pad 5 is exposed at the opening 10a in the insulating layer 10. The conductive film 9 covers the opening 10a so as to be in contact with the surface of the panel identification pad 5. The conductive paste 6 extends from the periphery of the CF substrate 2 across the boundary between the TFT substrate 1 and the CF substrate 2, and covers the conductive film 9. Thus, the panel identification pad 5 is electrically connected with the transparent conductive film 3 on the periphery of the CF substrate 2.

Figure 5:
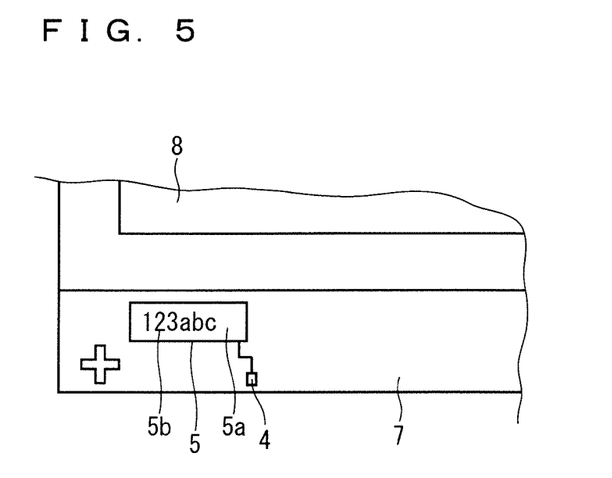
FIG. 5 is an enlarged view of a panel identification pad and its surroundings included in the liquid crystal display device.

The panel identification pad 5 will now be described. FIG. 5 is an enlarged view of the panel identification pad 5 and its surroundings included in the liquid crystal display device. As illustrated in FIG. 5, the panel identification pad 5 includes a metal film pattern portion 5a having a metal film pattern formed therein and a display portion 5b indicating a mark including alphanumeric characters. With reference to FIG. 5, a metal film is openworked to make the mark visible in the display portion 5b, which is separated from the metal film pattern portion 5a. In this case, the area that is electrically connected with the conductive paste 6 as illustrated in FIG. 3 preferably belongs to the metal film pattern portion 5a.

In some embodiments, there is no such clear division between the metal film pattern portion 5a and the display portion 5b in FIG. 5. For example, the metal film pattern portion 5a surrounding the periphery of the display portion 5b may be electrically connected with the conductive paste 6. In this case, the display portion 5b may include a two-dimensional barcode. The panel identification pad 5 is electrically connected with the FPC connection electrode 4 through a conductive member made of, for example, metal. Supplying ground potential from the FPC mounted on the FPC connection electrode 4 establishes a ground for the panel identification pad 5.

As illustrated in FIGS. 3 and 4, the conductive film 9 is covered with the conductive paste 6 in a manner to be isolated from the outside environment, and thus, the corrosion resistance of the conductive film 9 is less likely to suffer.

The outline of the conductive film 9 in a plan view may be larger than the outline of the panel identification pad 5 in a plan view. The conductive paste 6 covers the conductive film 9. Thus, the outline of the conductive paste 6 in a plan view is larger than the outline of the conductive film 9 in a plan view. The applied conductive paste 6 above can be visually checked for adequacy from the TFT substrate 1 side without difficulty, and the liquid crystal display device can accordingly achieve the predetermined level of quality.

The conductive member in some embodiments may be a conductive tape, instead of the conductive paste 6.

Figure 6:
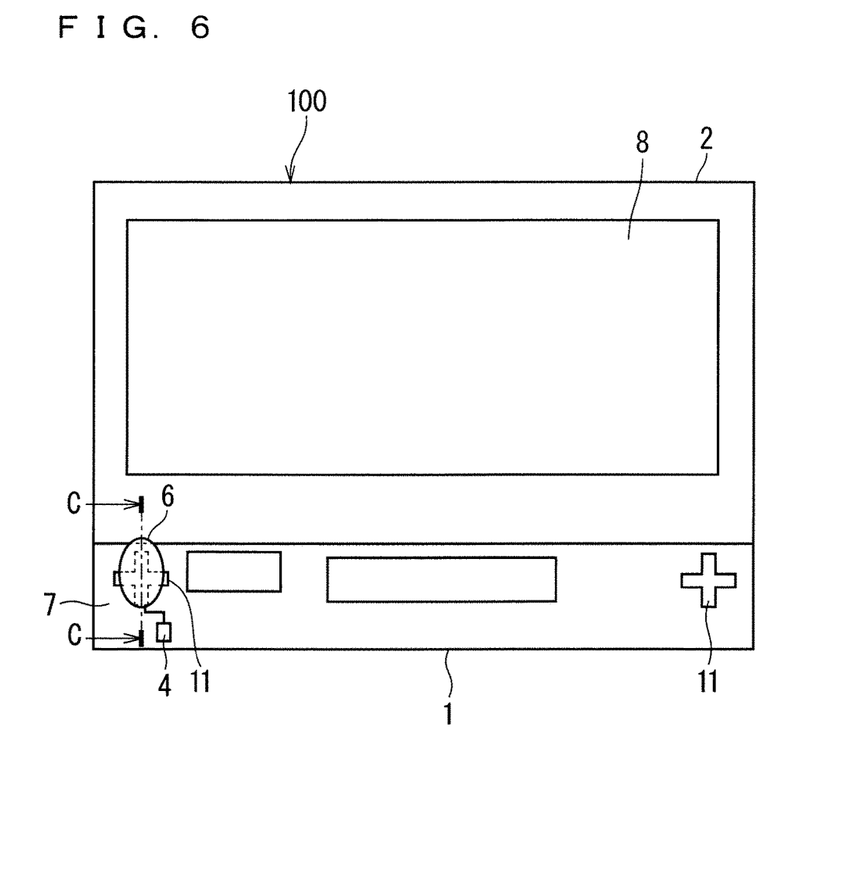
FIG. 6 is a plan view of a liquid crystal display device according to a modification of the preferred embodiment.
Figure 7:
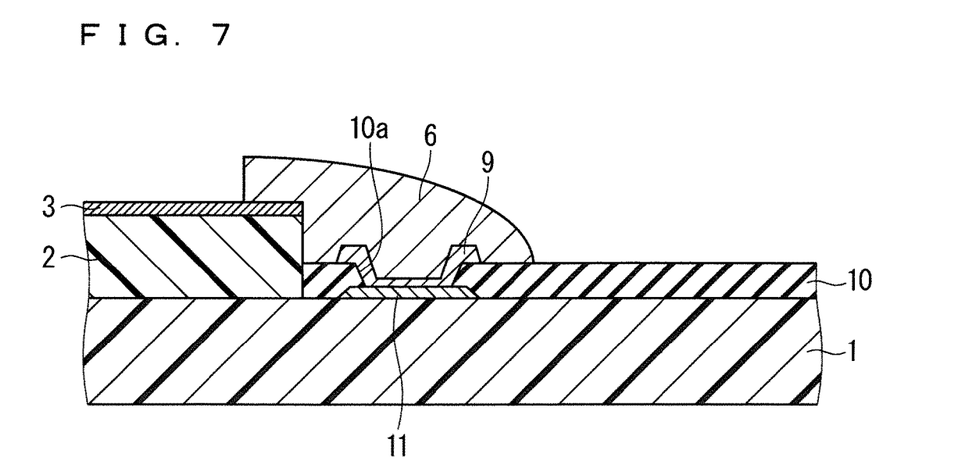
FIG. 7 is a cross-sectional view of the liquid crystal display device taken along the line C-C of FIG. 6.

The following will describe a liquid crystal display device according to a modification of the preferred embodiment. FIG. 6 is a plan view of the liquid crystal display device according to the modification of the preferred embodiment. FIG. 7 is a cross-sectional view of the liquid crystal display device taken along the line C-C of FIG. 6.

As illustrated in FIGS. 6 and 7, in place of the panel identification pad 5 of the preferred embodiment, a device discrimination mark 11, which is no longer used after the shipment of the display device, doubles as the grounding electrode according to the modification of the preferred embodiment. The device discrimination mark 11 serves as the identification mark. The device discrimination mark 11 is made of a conductive material such as metal. The above-mentioned configuration of the preferred embodiment is applied to establish a ground for the device discrimination mark 11. The following will not repetitively describe this configuration and other aspects of the modification, which are similar to the preferred embodiment. Although the device discrimination mark 11 serves as the grounding electrode in this modification, any other metal pattern that are no longer used after the shipment of the display device can double as the grounding electrode.

The above-mentioned liquid crystal display device has one grounding electrode. Alternatively, the liquid crystal display device may have two or more grounding electrodes. In this case, the panel identification pad 5, the device discrimination mark 11, and other metal patterns that are not connected with the display surface of the liquid crystal display panel 100 serve as grounding electrodes, and each grounding electrode is covered with the conductive paste 6. This configuration provides redundant ground electrodes while contributing to reduced frame width of the liquid crystal display device.

As described above, the liquid crystal display devices according to the preferred embodiment and the modification thereof each include the transparent conductive film 3, the identification mark, and the conductive member. The transparent conductive film 3 is located on the front surface side of the CF substrate 2 including the periphery of the CF substrate 2. The identification mark is located on the terminal area 7 that is a portion of the TFT substrate 1 extending beyond the CF substrate 2. The identification mark is conductive and is connected to the ground potential. The conductive member electrically connects the identification mark with the transparent conductive film 3 on the periphery of the CF substrate 2.

The identification mark, which is no longer used after the shipment of the display device, doubles as the grounding electrode. This eliminates the need for another grounding electrode on the terminal area 7 of the TFT substrate 1, and thus contributes to the reduced frame width of the liquid crystal display device. Using this structure one can obtain a compact liquid crystal display device.

If electric charge associated with static electricity enters the conductive member or the surface of the color filter, the electric charge would be inhibited from entering the display area 101 and would be discharged through the identification mark that is located on the terminal area 7 of the TFT substrate 1 and is not electrically connected with the display area 101. This can minimize a weakening of resistance of the liquid crystal display device to static electricity.

The liquid crystal display device further includes the insulating layer 10 and the conductive film 9. The insulating layer 10 is located on the TFT substrate 1 and covers the identification mark, with a part of the identification mark being exposed from the insulating layer 10. The conductive film 9 is located between the conductive member and the part of the identification mark exposed form the insulating layer 10 so as to establish an electrical connection therebetween. The conductive film 9 is covered with the conductive member. The conductive film 9 is isolated from the outside environment, and thus, the corrosion resistance of the conductive film 9 is less likely to suffer.

The liquid crystal display device may include two or more identification marks and two or more conductive members. This configuration provides redundant ground electrodes while contributing to reduced frame width of the liquid crystal display device.

The outline of the conductive film 9 in a plan view is larger than the outline of the identification mark in a plan view. The conductive member covers the conductive film 9. Thus, the outline of the conductive member in a plan view is larger than the outline of the conductive film 9 in a plan view. The applied conductive material can be visually checked for adequacy from the TFT substrate 1 side without difficulty, and the liquid crystal display device can accordingly achieve the predetermined level of quality.

The identification mark above is the panel identification pad 5 or the device discrimination mark 11. The efficient use of an existing component such as the ID pad or the discrimination mark can minimize an increase in the cost of manufacturing liquid crystal display devices.

The conductive member above is the conductive paste 6 or a conductive tape. The use of such a commercially available material can minimize an increase in the cost of manufacturing liquid crystal display devices.

The liquid crystal display device above, which is a transverse electric-field liquid crystal display device, can effectively dissipate electric charge on the surface of the liquid crystal display panel 100, and can accordingly achieve the predetermined level of display quality.

In the present invention, the above preferred embodiment can be varied or omitted as appropriate within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device comprising:
   a TFT substrate;
   a color filter substrate that is opposed to said TFT substrate and has a color filter;
   liquid crystals sealed between said TFT substrate and said color filter substrate;
   a transparent electrode that is located on a front surface side of said color filter substrate including a periphery of said color filter substrate;
   at least one identification mark located on a terminal area that is a portion of said TFT substrate extending beyond said color filter substrate, said at least one identification mark being conductive and connected to a ground potential, said at least one identification mark being either a panel identification pad including alphanumeric characters or a device discrimination mark including a cross-like figure, said alphanumeric characters or said cross-like figure being used to recognize said liquid crystal display device; and
   at least one conductive member that electrically connects said at least one identification mark with said transparent electrode located on the periphery of said color filter substrate.

2. The liquid crystal display device according to claim 1, further comprising:
   an insulating layer that is located on said TFT substrate and covers said at least one identification mark, with a part of said at least one identification mark being exposed from said insulating layer; and
   a conductive film that is located between said at least one conductive member and the part of said at least one identification mark exposed from said insulating layer so as to establish an electrical connection therebetween, wherein said conductive film is covered with said at least one conductive member.

3. The liquid crystal display device according to claim 1, wherein said at least one identification mark comprises a plurality of said identification marks and said at least one conductive member comprises a plurality of said conductive members.

4. The liquid crystal display device according to claim 2, wherein an outline of said conductive film in a plan view is larger than an outline of said at least one identification mark in a plan view.

5. The liquid crystal display device according to claim 1, wherein said at least one conductive member comprises conductive paste or a conductive tape.

6. The liquid crystal display device according to claim 1, wherein said liquid crystal display device comprises a transverse electric-field liquid crystal display device.

* * * * *